(12) United States Patent
Rose et al.

(10) Patent No.: US 8,353,345 B2
(45) Date of Patent: *Jan. 15, 2013

(54) GEOTHERMAL WELL DIVERSION AGENT FORMED FROM IN SITU DECOMPOSITION OF CARBONYLS AT HIGH TEMPERATURE

(75) Inventors: Peter E. Rose, Salt Lake City, UT (US); Daniel L. Bour, Granite Falls, WA (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/190,405

(22) Filed: Jul. 25, 2011

(65) Prior Publication Data

US 2011/0278000 A1    Nov. 17, 2011

Related U.S. Application Data

(63) Continuation of application No. 12/544,553, filed on Aug. 20, 2009, now Pat. No. 8,091,639.

(60) Provisional application No. 61/225,461, filed on Jul. 14, 2009, provisional application No. 61/090,292, filed on Aug. 20, 2008.

(51) Int. Cl.
*E21B 33/13*   (2006.01)
*E21B 33/138*  (2006.01)
*E21B 43/26*   (2006.01)

(52) U.S. Cl. ........ 166/281; 166/288; 166/294; 166/300; 166/302; 166/307; 166/308.1; 507/244; 507/267; 507/268; 507/277

(58) Field of Classification Search ........................ None
See application file for complete search history.

(56) References Cited

U.S. PATENT DOCUMENTS

| | | |
|---|---|---|
| 3,195,630 A | 7/1965 | Fisher |
| 3,390,723 A | 7/1968 | Hower et al. |
| 3,526,097 A | 9/1970 | Nelson |
| 3,942,101 A | 3/1976 | Saye et al. |
| 3,960,736 A | 6/1976 | Free et al. |
| 4,055,399 A | 10/1977 | Parrish |
| 4,126,406 A | 11/1978 | Traylor et al. |
| 4,223,729 A | 9/1980 | Foster |

(Continued)

FOREIGN PATENT DOCUMENTS

DE    3925337 A1    2/1991

(Continued)

OTHER PUBLICATIONS

Adams, et al., "Kinetics of Fluorescein Decay and Its Application as a Geothermal Tracer", Geothermics, vol. 20, No. 1-2, 1991, pp. 53-66.

(Continued)

*Primary Examiner* — George Suchfield
(74) *Attorney, Agent, or Firm* — King Spalding LLP; Sanjeet Dutta

(57) ABSTRACT

A method of selectively blocking fractures in a subterranean formation by injecting a diversion agent into the well is disclosed. According to one embodiment, the method comprises injecting a diversion agent into a subterranean formation to form an alkaline-earth carbonate precipitate from decomposition of a carbonyl compound, wherein the diversion agent includes the carbonyl compound and an alkaline-earth halide salt.

20 Claims, 2 Drawing Sheets

U.S. PATENT DOCUMENTS

| | | | |
|---|---|---|---|
| 4,520,666 A | 6/1985 | Coblentz et al. | |
| 4,559,818 A | 12/1985 | Tsang et al. | |
| 4,573,537 A | 3/1986 | Hirasuna | |
| 4,577,679 A | 3/1986 | Hibshman | |
| 4,716,964 A | 1/1988 | Erbstoesser et al. | |
| 4,749,035 A | 6/1988 | Cassity | |
| 4,832,121 A | 5/1989 | Anderson | |
| 4,926,949 A | 5/1990 | Forrest | |
| 4,976,142 A | 12/1990 | Perales | |
| 5,143,155 A * | 9/1992 | Ferris et al. | 166/300 |
| 5,163,321 A | 11/1992 | Perales | |
| 5,165,235 A | 11/1992 | Nitschke | |
| 5,246,860 A | 9/1993 | Hutchins et al. | |
| 5,515,679 A | 5/1996 | Shulman | |
| 5,595,245 A | 1/1997 | Scott, III | |
| 5,723,781 A | 3/1998 | Pruett et al. | |
| 5,890,536 A | 4/1999 | Nierode et al. | |
| 5,931,000 A | 8/1999 | Turner et al. | |
| 5,944,446 A | 8/1999 | Hocking | |
| 6,016,191 A | 1/2000 | Ramos et al. | |
| 6,125,934 A | 10/2000 | Lenn et al. | |
| 6,291,404 B2 | 9/2001 | House | |
| 6,401,819 B1 * | 6/2002 | Harris et al. | 166/300 |
| 6,543,538 B2 | 4/2003 | Tolman et al. | |
| 6,659,175 B2 | 12/2003 | Malone | |
| 6,758,271 B1 | 7/2004 | Smith | |
| 7,032,662 B2 | 4/2006 | Malone et al. | |
| 7,207,389 B2 | 4/2007 | Foster et al. | |
| 7,265,079 B2 | 9/2007 | Willberg et al. | |
| 7,296,625 B2 | 11/2007 | East, Jr. | |
| 7,299,873 B2 | 11/2007 | Hartman et al. | |
| 7,347,260 B2 | 3/2008 | Ferguson et al. | |
| 7,380,600 B2 | 6/2008 | Willberg et al. | |
| 7,389,185 B2 | 6/2008 | Craig et al. | |
| 7,523,024 B2 | 4/2009 | Endres et al. | |
| 7,565,929 B2 | 7/2009 | Bustos et al. | |
| 7,580,796 B2 | 8/2009 | Soliman et al. | |
| 7,753,122 B2 | 7/2010 | Curlett | |
| 7,767,629 B2 | 8/2010 | Shinbach et al. | |
| 7,832,482 B2 | 11/2010 | Cavender et al. | |
| 7,833,950 B2 | 11/2010 | Willberg et al. | |
| 7,964,539 B2 | 6/2011 | Kotlar | |
| 2003/0079877 A1 | 5/2003 | Wellington et al. | |
| 2004/0074642 A1 | 4/2004 | Price-Smith et al. | |
| 2007/0254814 A1 * | 11/2007 | Kotlar | 507/233 |
| 2007/0272407 A1 | 11/2007 | Lehman et al. | |
| 2008/0108519 A1 * | 5/2008 | Harris et al. | 507/103 |
| 2008/0128108 A1 | 6/2008 | Clark | |
| 2008/0210423 A1 * | 9/2008 | Boney | 166/281 |
| 2009/0065253 A1 | 3/2009 | Suarez-Rivera et al. | |

FOREIGN PATENT DOCUMENTS

| | | |
|---|---|---|
| EP | 0338154 A1 | 10/1989 |
| EP | 0357317 A | 3/1990 |
| EP | 0435430 A1 | 7/1991 |
| EP | 1980604 A | 10/2008 |
| GB | 2288694 A | 10/1995 |
| WO | WO 99/05394 A | 2/1999 |
| WO | WO 2004/076815 A | 9/2004 |
| WO | WO 2005/001242 A2 | 1/2005 |
| WO | WO 2006/022325 A2 | 1/2006 |
| WO | WO 2008/064074 | 5/2008 |
| WO | WO 2008/107831 A2 | 9/2008 |
| WO | WO 2008/122114 | 10/2008 |
| WO | WO 2008/156970 | 12/2008 |

OTHER PUBLICATIONS

Galbreath, et al., "Components on High Temperature Plugs: Progress Report on Polymers and Silicates", Geothermal Resources Council Transactions, vol. 28, Aug. 29-Sep. 1, 2004, pp. 145-152.

Tester, et al., "The Future of Thermal Energy: Impact of Enhanced Geothermal Systems (EGS) on the United States in the $21^{st}$ Century", (Retrieved from the Internet, <URL: geothermal.inel.gov/publications/future_or_geothermal_energy.pdf>) 2006, 372 pages.

Van de Velde, et al., "Biopolymers: Overview of Several Properties and Consequences on their Applications", Polymer Testing, 21, 2002, pp. 433-442.

Rose, et al., "Greatly Enhanced Detectability of Geothermal Tracers Through Laser-Induced Fluorescence", Final Technical Report for DOE Project DE-FG07-98ID13619 Oct. 30, 2002, 10 pages.

PCT/US2009/053304—International Search Report, dated Mar. 11, 2009.

PCT/US2009/042137—International Search Report, dated Aug. 21, 2009.

PCT/US2009/042421—International Search Report, dated Sep. 14, 2009.

PCT/US2009/054536—International Search Report, dated Nov. 18, 2009.

PCT/US2009/049844—International Search Report, dated Dec. 17, 2009.

PCT/US2009/030013—International Search Report, dated Jun. 7, 2010.

PCT/US2010/036969—International Search Report, dated Jul. 21, 2010.

PCT/US2010/038420—International Search Report, dated Aug. 18, 2010.

* cited by examiner

GEOTHERMAL WELL DIVERSION AGENT FORMED FROM IN SITU DECOMPOSITION OF CARBONYLS AT HIGH TEMPERATURE

RELATED APPLICATIONS

This application is a continuation of U.S. application Ser. No. 12/544,553 which claims the benefit of priority to Provisional Application Nos. 61/090,292, filed Aug. 20, 2008, and 61/225,461, filed Jul. 14, 2009, each of which is incorporated by reference in its entirety.

BACKGROUND

It is often desirable to increase the fracture surface area and/or modify the fluid flow pattern within a subterranean formation such as geothermal reservoirs, Engineered Geothermal Systems (EGS), or steam-flooded petroleum fields. Increases in surface area can be equated to increased rates of energy introduction/extraction. The conventional method of increasing surface area is through a hydraulic stimulation procedure wherein large volumes of water are injected at high flow rates over several days to create shear failure in tight fractures adjacent the wellbore which leads to an increase in permeability. However, fracturing is often non-uniform and one very permeable (high flow) fracture is created in combination with many smaller fractures each possessing low permeability. This creates a non-uniform flow process with reduced heat exchange capability because most of the injected fluid enters and flows through the highly permeable fracture. Greater heat exchange can be obtained efficiently if flow is more uniformly dispersed among fractures.

Unfortunately, additional stimulation tends to also further expand high flow fractures thus reducing the stimulation affect on smaller low flow fractures. Furthermore, as certain portions of the geothermal reservoir become depleted productivity can be compromised requiring either further stimulation and/or plugging of unproductive fractures.

Similarly, oil and gas field operators frequently inject steam into oil and gas bearing formations. The increased temperature can improve the "flowability" of the oil and is often used for extraction of very thick or heavy oils. In this process, steam often follows paths of minimal resistance, referred to as short-circuits, that are present or that develop over time. When these short-circuits are present, a disproportionate amount of steam is injected into these which frequently results in poor injection into and ultimately poor sweep efficiency and incomplete oil recovery from, other portions of the formation.

Currently, high flow fractures and/or unwanted fractures can be permanently or temporarily plugged using cement. Such approaches can be difficult to uniformly cure and control plugging and flow. Although somewhat effective, subsequent removal of the cement typically requires expensive drilling with a workover drill rig. Other approaches include the use of packers. These materials can become stuck in the wellbore thereby requiring expensive and time-consuming procedures, such as fishing, to remove the obstructions. Sometimes fishing is unsuccessful and side-track drilling or other approaches become needed in order to restore wellbore function. Other systems for plugging these high-flow or unwanted fractures, such as precipitation of sodium silicate, can result in plugging of the formation that cannot be subsequently removed due to the insoluble nature of the precipitate. Further, such systems frequently require extended periods of down-time which can reduce productivity and increase costs.

SUMMARY

A method of selectively blocking fractures in a subterranean formation by injecting a diversion agent into the well is disclosed. According to one embodiment, the method comprises injecting a diversion agent into a subterranean formation to form an alkaline-earth carbonate precipitate from decomposition of a carbonyl compound, wherein the diversion agent includes the carbonyl compound and an alkaline-earth halide salt.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention and they are, therefore, not to be considered limiting of its scope. It will be readily appreciated that the components of the present invention, as generally described and illustrated in the figures herein, could be arranged, sized, and designed in a wide variety of different configurations. Nonetheless, the invention will be described and explained with additional specificity and detail through the use of the accompanying drawing in which:

DETAILED DESCRIPTION

Figure 1:
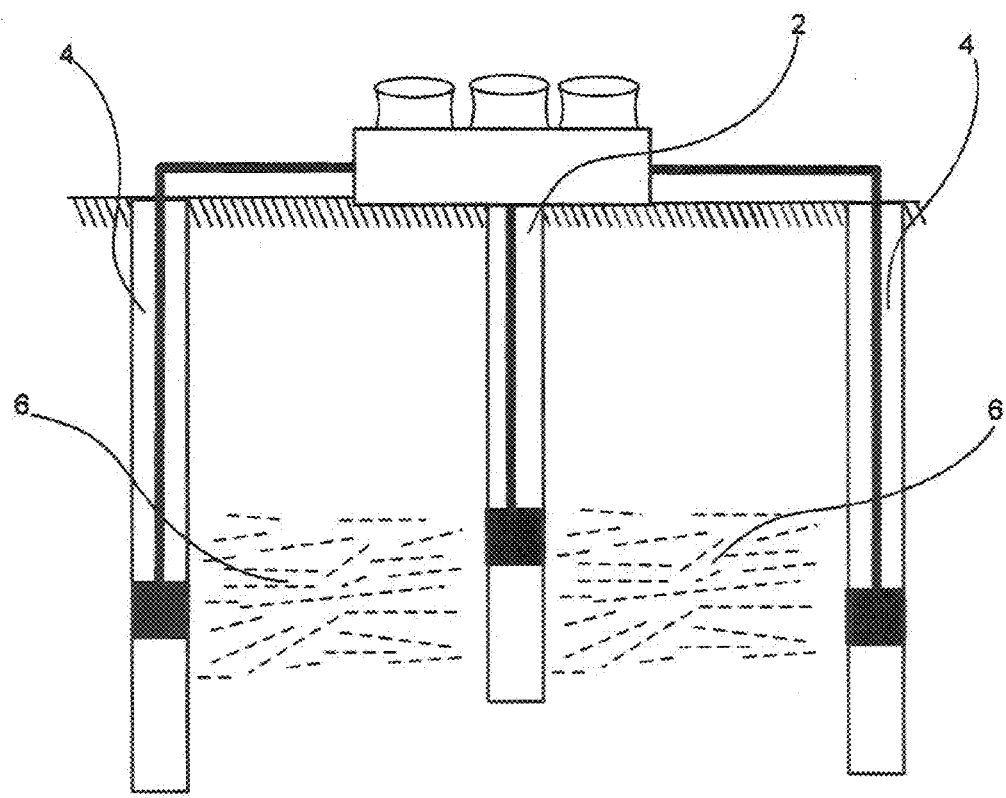
FIG. 1 is a simplified schematic of a stimulated well EGS in accordance with one embodiment.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following detailed description of the embodiments of the present invention is not intended to limit the scope of the invention, as claimed, but is presented for purposes of illustration only and not limited to describe the features and characteristics of the present invention, but to set forth the best mode of operation of the invention, and to sufficiently enable one skilled in the art to practice the invention. Accordingly, the scope of the present invention is to be defined solely by the appended claims.

DEFINITIONS

In describing and claiming the present embodiments, the following terminology will be used.

The singular forms "a," "an," and "the" include plural referents unless the context clearly dictates otherwise. Thus, for example, reference to "a compound" includes reference to one or more of such materials and reference to "injecting" refers to one or more such steps.

As used herein with respect to an identified property or circumstance, "substantially" refers to a degree, of deviation that is sufficiently large so as to measurably detract from the identified property or circumstance. The exact degree of deviation allowable may in some cases depend on the specific context. For example, in one embodiment, "substantially" can be referred to greater than 0.5%. Thus, substantially no precipitation means that the flow is reduced by no greater than 0.5%.

As used herein, "adjacent" refers to the proximity of two structures or elements. Particularly, elements that are identified as being "adjacent" may be either abutting or fluidly connected. Such elements may also be near or close to each other without necessarily contacting each other. The exact degree of proximity may in some cases depend on the specific context.

As used herein, "subterranean formation" can refer to any underground geologic structure including, but not limited to geothermal reservoirs, petroleum reservoirs, sequestering reservoirs, Engineered Geothermal Systems, and the like. The subterranean formation can include or be adjacent to geothermal wells, petroleum wells, natural gas wells, and/or other man-made structures.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such a range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

In the present disclosure, the term "preferably" or "preferred" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

FIG. 1 shows a general EGS including a single injection well 2 and two production wells 4, according to one embodiment. A large variety of configurations are possible in terms of the number of wells, geometry, and the like. In this case, a fluid can be injected into the injection well 2 where the fluid travels through fractures 6 in the adjacent formations outward towards the production wells 4. In the case of heat recovery, the fluid is heated via natural underground thermal sources. The production wells 4 are located such that the heated fluid can be recovered and directed to a suitable heat transfer mechanism for producing power or the like, e.g. steam turbines. Although geothermal reservoirs are exemplified, this method can also be applied to petroleum recovery wells (such as steam-flooded injection wells), natural gas wells, or any other subterranean natural resource which relies on fluid flows through fractures to recover heat or useful fluids. Further, these methods can be used to increase storage capacity of underground sequestering reservoirs for use in sequestering fluids, e.g. carbon dioxide or the like.

In order to provide additional control over fluid flow through these underground fractures, a method of selectively blocking fractures in a subterranean formation adjacent a geothermal well can include injecting a diversion agent into the geothermal well. This can be performed under conditions sufficient to form a carbonate precipitate from decomposition of a carbonyl compound. More particularly, the diversion agent can include a carbonyl compound and an alkaline-earth halide salt. The carbonyl compound degrades at elevated temperatures, e.g. above 135° C., and forms a carbonate precipitate in the presence of an alkaline earth halide salt. The carbonyl acts as a source of carbon for formation of the carbonate while the alkaline-earth halide salt provides an alkaline-earth cation.

The diversion agent can include a carbonyl compound such as urea or dimethyl carbonate. In one aspect, non-limiting examples of alkaline-earth halide salts that can be used as a component of the diversion agent can include, calcium chloride, magnesium chloride, calcium bromide, calcium iodide, magnesium bromide, magnesium iodide or combinations of these materials. Reaction I illustrates the basic reaction that occurs between the carbonyl compound and the alkaline earth halide salt, and specifically shows the reaction between urea and calcium chloride.

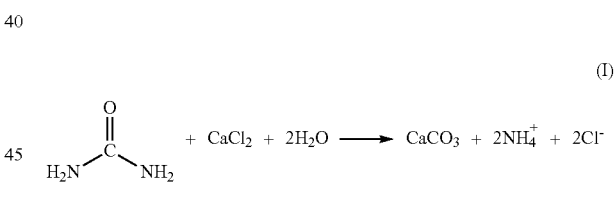

(I)

Similarly, Reaction II illustrates the reaction when the diversion agent includes dimethyl carbonate and calcium chloride.

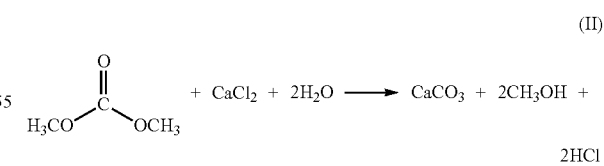

(II)

The carbonyl compound, such as the urea or dimethyl carbonate exemplified above, can be present in the diversion agent at a molar concentration of 0.01 M to about 100 M. In one embodiment, the carbonyl compound can be present in the diversion at a molar concentration of 0.1 M to 10 M. Similarly the alkaline earth halide salt can be present in the diversion agent at molar concentrations of 0.01 M to about 100 M, or from 0.1 M to 10 M. Depending on the particular application, the molar ratio of the carbonyl compound to the alkaline earth halide salt can range from 100:1 to 1:100. In one embodiment, the molar ratio of carbonyl compound to alkaline earth halide salt can be 10:1 to 1:10. In another embodiment, the carbonyl compound to alkaline earth halide salt molar ratio can be about 1:1.

The diversion agent can optionally include additional components and/or additives such as, but not limited to flow control additives, nucleation enhancers, viscosity flow modifiers, fillers, and the like. In one aspect, a flow control additive can be used in order to control flow within the wellbore. Examples of flow control additives that can be used include, but are not limited to inert particulates, clays, thermally stable polymers, and combinations thereof. In one aspect, a particulate calcium carbonate can be used as an effective flow control additive. When used, the particulate calcium carbonate can also function as a nucleation seed for enhancing the rate of precipitation of the carbonate precipitate. Another class of additives can include internal breakers which decompose over time causing the diversion agent to dissolve. Such materials can be useful to allow removal and/or loosening of the carbonate precipitate without the need for acid treatments or other removal processes. In one example, the internal breaker is a time delay thermally degradable polymer such as BIO-VERT H150 (available from Halliburton) polyesters, polyorthoesters, polyglycolide (marketed as Dexon), polylactide, polycaprolactone, polydioxanone (a polyether-ester), polyhydroxybutyrates, and polyanhydrides.

Figure 2:
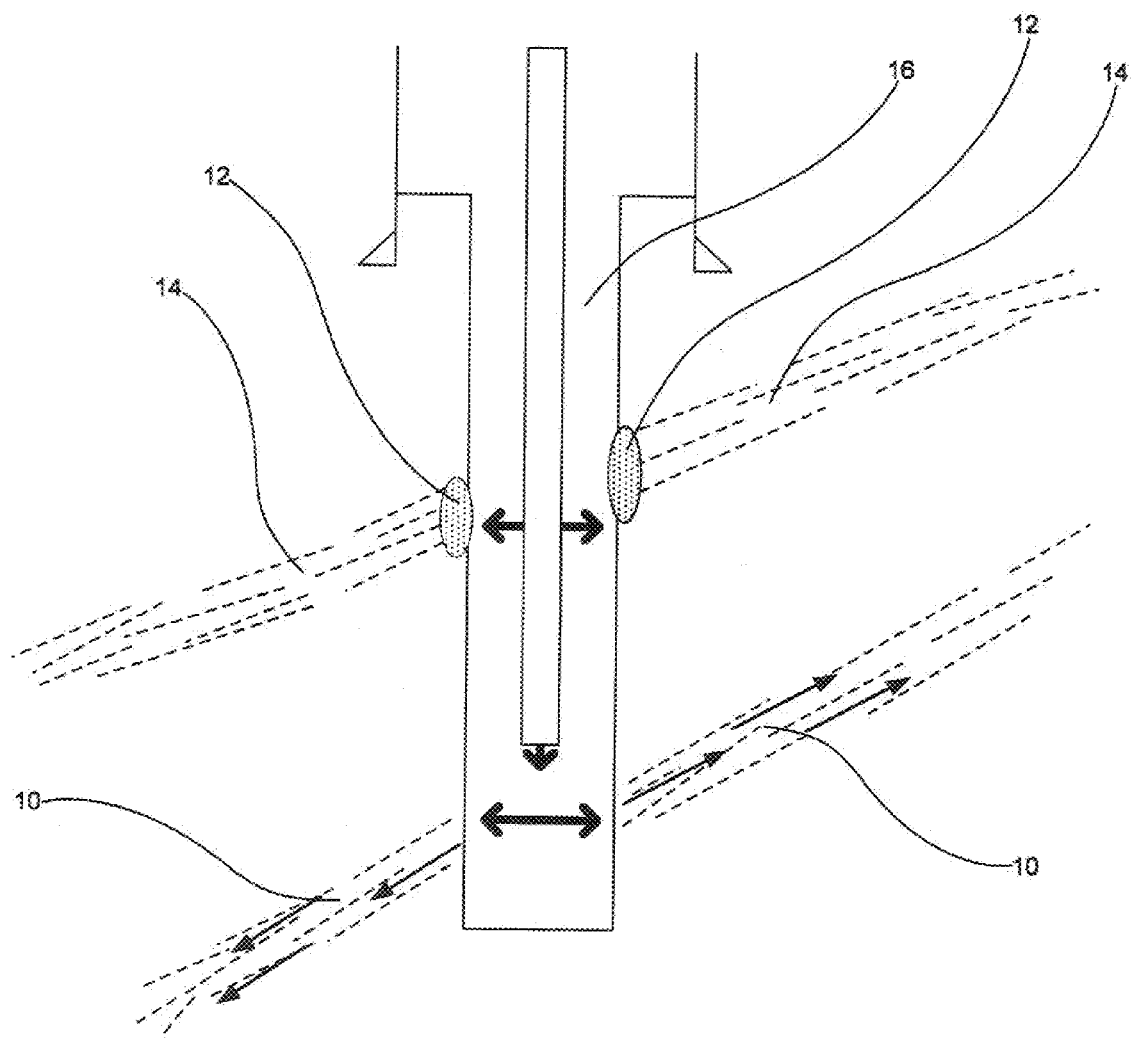
FIG. 2 is a schematic of a stimulated subterranean formation showing a well with one plugged and one newly stimulated fracture, according to one embodiment.

Although the specific conditions can vary depending on the diversion agent, the decomposition of the carbonyl compound typically occurs at a temperature of about 135° C. (275° F.) or above. In one aspect, the decomposition can occur at temperatures of about 150° C. Thus, the wellbore can be heated and/or cooled along selected regions in order to control areas where decomposition and deposition of the carbonate precipitate occur. In particular, cooler regions will yield reduced or substantially no precipitation of the carbonate in those target regions or fractures based on maintaining low temperatures. As such, at least one high flow fracture can be preferentially blocked (e.g. at least partially blocked) by the carbonate precipitate. This is readily accomplished due to the preferential high flow rate through the high flow fracture. Minor fractures may also be blocked during this process. FIG. 2 illustrates a subterranean formation, including a well, wherein a precipitated diversion agent substantially reduces the flow of a blocked fracture.

In one embodiment, a temperature monitoring device can be inserted into the well in order to monitor and/or control the temperatures of certain regions. In one embodiment, the temperature monitoring device can be a fiber optic tube or cable. The monitoring of the temperature of a region before, during and after treatment with the diversion agent can also help in determining the extent and/or effectiveness of the treatment. For example, if one high flow fracture is cooler than the rest of the well, blocking the fracture will increase the overall temperature of the fluid in the well. Further, in some situations it may be desirable to reduce or limit, but not completely block, flow in certain areas of the formation. By monitoring and/or controlling the temperature and duration or resonance time of the diversion agent in a particular area of a formation, the degree of precipitation may also be controlled.

The present system can provide the ability to resume normal operations, i.e. stimulation, steam injection, oil/gas extraction, etc., with little to no waiting after treatment. Unlike other methods known in the art, there is no need to allow time for drying or curing, resumption of normal operations can occur immediately after treatment. This allows for less downtime and can increase the overall production of the well. Additionally, the present methods can use simple pumping units and may not require specialized equipment such as costly drilling rigs or coiled tubing units, although such equipment can be used. Further, the precipitates formed are highly thermally stable and can be used at extreme temperatures.

Consistent with the above principles, the subterranean formation can be stimulated subsequent to injecting the diversion agent in order to increase fracture flow in a previously low flow fracture, relative to at least one high flow fracture which has been at least partially plugged by the carbonate precipitate. For example, FIG. 2 shows a newly stimulated unblocked fracture 10 below the blocked fracture 12. A hydraulic fluid is pumped into the well 16 and the pressure of fluid stimulates the unblocked fractures 10 while the blocked fractures 12, those that are plugged or partially plugged by the alkaline earth metal carbonate precipitate 14, are not stimulated. Typically, stimulating can be accomplished by hydraulic methods, although chemical and/or mechanical approaches can also be used. One method of stimulation can be done using two wells that are formed adjacent an incipient reservoir. Water or other fluid can be injected into the wells and adjacent fractures under high pressure in order to hydraulically stress the fractures in order to increase flow. Heat can then be extracted from the resulting higher flow reservoir by circulating a heat transfer fluid through the reservoir.

If the plugged fractures are not intended for permanent closure/plugging, the carbonate precipitate can be reduced or substantially removed sufficiently to unblock the fracture(s). One option for reopening the fractures is by providing an acid solution sufficient to dissolve the carbonate precipitate. Although a wide variety of acids can be suitable, weak organic acids and/or those which exhibit reduced disposal and environmental hazards are particularly desired. Non-limiting examples of suitable acids can include hydrochloric acid, acetic acid, formic acid, citric acid, and oxalic acid. The chelating agents nitrilotriacetate (NTA), ethylenediamine tetraacetate (EDTA), diethylenetriamine pentaacetate (DTPA), and combinations thereof can also be used to remove the carbonate diversion agents.

Subsequent to the above in situ plugging, diversion and stimulation procedures, the degree of stimulation can be assessed. For example, pressure, temperature, and/or spinner logging can help to quantify the creation of new fractures and flow rates within the wellbore and adjacent geothermal reservoir.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method, comprising:
   blocking a fracture in a subterranean formation by injecting a diversion agent into the fracture to form an alkaline-earth carbonate precipitate from decomposition of a carbonyl compound, wherein the diversion agent comprises the carbonyl compound and an alkaline-earth halide salt; and
   unblocking the fracture by dissolving the alkaline-earth carbonate precipitate.

2. The method of claim 1, wherein the carbonyl compound further comprises urea.

3. The method of claim 1, wherein the carbonyl compound further comprises dimethyl carbonate.

4. The method of claim 1, wherein the alkaline-earth halide salt is selected from the group consisting of calcium chloride, magnesium chloride, calcium bromide, calcium iodide, magnesium bromide, magnesium iodide, and combinations thereof.

5. The method of claim 1, wherein the alkaline-earth halide salt is calcium chloride.

6. The method of claim 1, wherein the carbonyl compound and the alkaline-earth halide salt are present in the diversion agent at molar concentrations of about 0.1 M to about 10 M.

7. The method of claim 1, wherein the diversion agent has a carbonyl compound to alkaline-earth halide salt molar ratio about 10:1 to about 1:10.

8. The method of claim 1, wherein dissolving the alkaline-earth carbon precipitate comprises adding a time delay degradable internal breaker to the diversion agent to dissolve the alkaline-earth carbon precipitate.

9. The method of claim 8, wherein the internal breaker is a time delay thermally degradable polymer.

10. The method of claim 1, wherein dissolving the alkaline-earth carbon precipitate comprises exposing the carbonate precipitate to an acid solution.

11. The method of claim 10, wherein the acid solution comprises a member selected from the group consisting of hydrochloric acid, acetic acid, formic acid, citric acid, oxalic acid, nitrilotriacetic acid (NTA), ethylenediamine tetraacetic acid (EDTA), diethylenetriamine pentaacetic acid (DTPA), and combinations thereof.

12. The method of claim 1, wherein the diversion agent further comprises a flow control additive.

13. The method of claim 12, wherein the flow control additive further comprises particulate calcium carbonate, which also acts as a nucleation seed for the carbonate precipitate.

14. The method of claim 1, wherein the decomposition occurs at a temperature of about 135° C. or more.

15. The method of claim 1, wherein the decomposition occurs at a temperature of about 150° C. or more.

16. The method of claim 1, further comprising stimulating the subterranean formation subsequent to the injecting in order to increase fracture flow within at least one additional fracture.

17. The method of claim 16, wherein stimulating is accomplished by hydraulic stimulation.

18. The method of claim 1, further comprising cooling selected portions of the subterranean formation prior to injecting in order to substantially reduce precipitation of the carbonate precipitate in target fractures adjacent the selected portions.

19. The method of claim 1, further comprising monitoring and/or controlling the temperature of selected regions in the subterranean formation by inserting a temperature monitoring device into the well.

20. The method of claim 19, wherein the temperature monitoring device is a fiber optic tube or cable.

* * * * *